United States Patent [19]

Shizuno

[11] Patent Number: 4,484,348
[45] Date of Patent: Nov. 20, 1984

[54] FIGURE RECOGNIZING SYSTEM

[75] Inventor: Masaaki Shizuno, Yokohama, Japan

[73] Assignee: Tokyo Shibaura Denki Kabushiki Kaisha, Kawasaki, Japan

[21] Appl. No.: 332,297

[22] Filed: Dec. 18, 1981

[30] Foreign Application Priority Data

Dec. 22, 1980 [JP] Japan .................... 55-181612

[51] Int. Cl.³ ............................................ G06K 9/68
[52] U.S. Cl. ................................. 382/48; 382/1; 382/34
[58] Field of Search .............. 382/1, 30, 33, 34, 42, 382/48

[56] References Cited

U.S. PATENT DOCUMENTS

| | | | |
|---|---|---|---|
| 3,541,511 | 11/1970 | Genchi | 382/1 |
| 3,688,267 | 8/1972 | Iijima | 382/36 |
| 3,846,753 | 11/1974 | Spanjersberg | 382/48 |
| 3,969,577 | 7/1976 | Lloyd | 358/106 |
| 4,013,999 | 3/1977 | Erwin | 382/1 |
| 4,034,341 | 7/1977 | Isono | 382/1 |
| 4,058,795 | 11/1977 | Balm | 382/40 |
| 4,200,861 | 4/1980 | Hubach | 382/34 |
| 4,288,781 | 9/1981 | Sellner | 382/34 |

FOREIGN PATENT DOCUMENTS

2349116 4/1974 Fed. Rep. of Germany.
2545753 4/1976 Fed. Rep. of Germany.

OTHER PUBLICATIONS

8092 ICCC Trans. on Computers-vol. C-27, No. 8, (1978.08), "A Multifont Word Recognition System for Postal Address Reading".

*Primary Examiner*—Howard W. Britton
*Attorney, Agent, or Firm*—Cushman, Darby and Cushman

[57] ABSTRACT

In a figure recognizing system according to the invention comprising a scanning section, a detecting section, thesauruses, a similarity computing section, a storage register for storing detected information from the detecting section and a recognizing section for recognizing the final letter information, threshold table means in which letter combinations and corresponding threshold levels are stored as pairs, a category judgement section for receiving the output of the similarity computing section, obtaining a similarity difference from the maximum and next maximum similarity values and comparing the similarity difference thus obtained and a corresponding threshold level in the threshold table means to judge the category of said letter, format table means where a predetermined category series is stored, and format judging means for comparing the category supplied from the detecting section and category judgement section connected thereto and the category series supplied from the format table means.

3 Claims, 7 Drawing Figures

FIGURE RECOGNIZING SYSTEM

BACKGROUND OF THE INVENTION

This invention relates to a figure recognizing system for reading out a particular content from those entries whose contents are substantially fixed as, for example, in the address of postal matter.

The presently available zip code reading apparatus deal with only numeral letters printed on a definte position as prescribed by the Postal Law. However, if it is intended to permit reading of zip codes written in freer positions, that is, if it is intended to permit reading through discrimination zip codes from among letter rows separated by blanks or section numerals, the following problems are encountered.

(1) A number of characters or letters have to be dealt with in order to find a zip code.

(2) The letters that may be dealt with are not limited to numeral letters, and a great number of letters have to be handled. Where a large number of letters and a plurality of kinds of letters are handled, the recognition process for recognizing these letters are very complicated, and very inefficient reading of the zip code is inevitable.

SUMMARY OF THE INVENTION

An object of the invention is to provide a figure recognizing system, which permits efficient reading of particular content of description written or imprinted on free positions of a recording medium, thus permitting the result of reading.

To achieve this object, the figure recognizing system according to the invention comprises:

(a) a scanning section for reading out letter information of various letter species recorded on a recording medium;

(b) a detecting section connected to said scanning section for effecting letter detection from the letter information from said scanning section;

(c) thesauruses consisting of standard letter patterns of various letter species corresponding to said various letter species;

(d) a similarity computing section for receiving information from said detecting section and standard letter pattern information from said thesauruses and computing the similarity corresponding to the letter information from said detecting section;

(e) threshold table means in which letter combination and threshold levels for the respective letter combinations are stored as pairs;

(f) a category judgement section for receiving the output of said similarity computing section, obtaining a similarity difference from the maximum and next maximum values of said similarity and comparing said similarity difference and a corresponding threshold level of said threshold means to judge the category of said letters;

(g) format table means where a predetermined category series is stored;

(h) format judging means connected to said detecting section and category judgement section for comparing a category supplied from said detecting section and a category series supplied from said detecting section;

(i) storage means for storing the detected information from said detecting section; and (j) a recognizing section connected to said format judging section and storage means for recognizing the content of said storage means to provide final letter information if a coincidence is obtained as a result of judgement in said format judging section.

With the figure recognizing system according to the invention, the similarity of each read-out letter is computed by using thesauruses consisting of various standard letter patterns corresponding to various letter species, the letter species is judged according to the result of computation, the format of the letter row obtained from the result of judgement and the format of least one kind of letter row that is previously stored are compared, and the read-out letter is recognized when and only when the compared formats coincides with each other. Thus, it is possible to reduce time required for reading out the particular content of description written on free positions on a recording medium. In addition, if the formats compared do not coincide, the postal matter is rejected and not subjected to the aforementioned recognizing operation, so that it is possible to improve the reliability of the result of reading and increase the efficiency of processing in the recognizing section.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENTS

Figure 1:
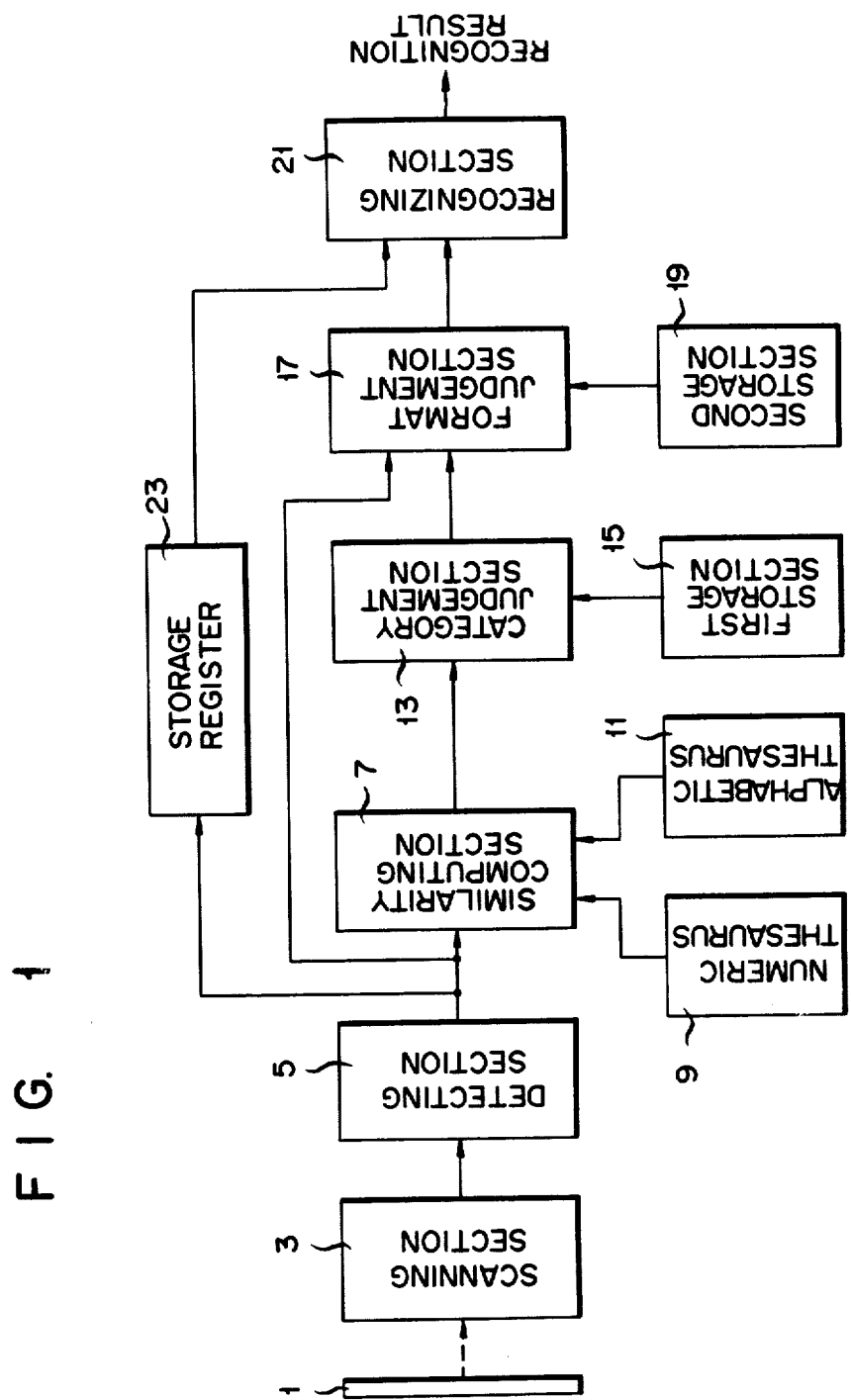
FIG. 1 is a block diagram showing one embodiment of the figure recognizing system according to the invention.
Figure 2:
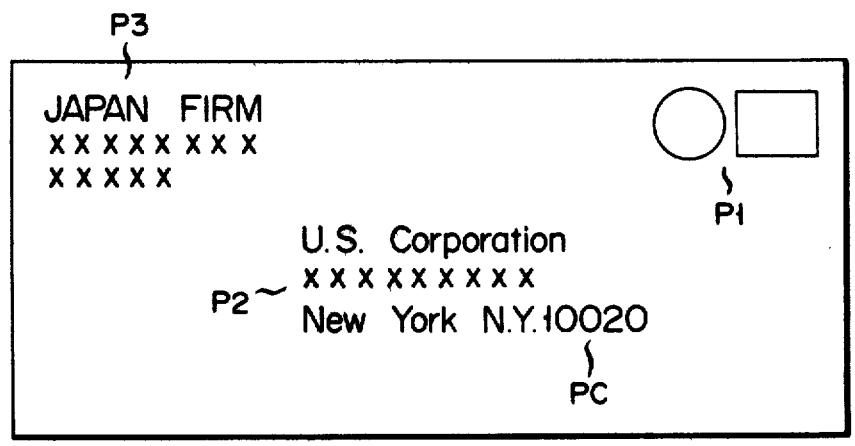
FIG. 2 is a plan view showing a postal matter read out by the figure recognizing system according to the invention.

Referring now to FIG. 1, designated at 1 is a recording medium such as postal matter. The postal matter 1 has impressions of a post stamp P1, a destination address P2 and a sender's address P3 as shown in FIG. 2. The destination address P2 includes a postal number, or zip code which is recorded as a numeral figure block PC. The zip code and other impression on the postal matter 1 are optically read out in a scanning section 3. The output of the scanning section 3 is fed to a detecting section 5. The detecting section 5 converts the read-out signal from the scanning section 3 into a quantized pattern. At this time, the section 5 divides the input data into separate letter rows for respective letter blocks by detecting blanks and special section signals, and also effects correction of the positions of the letters by normalizing the size of each of the letters. The output of the detecting section 5 is fed to a similarity computing section 7, a storage register 23 and a format judgement section 17.

The similarity computing section 7 calculates the similarites of the letter pattern of each letter supplied from the detecting section 5 with respect to numerals and alphabet letters by using a numeric thesaurus 9 and an alphabetic thesaurus 11. The numeric thesaurus 9 consists of various standard numeric patterns for the numerals "0" to "9", and the alphabetic thesaurus 11 consists of various alphabetic letter patterns for "A" to "Z". The output of the similarity computing section 7 is fed to a category judgement section 13. At this time, data of similarities with respect to the numeric thesaurus 9 and that with respect to the alphabetic thesaurus 11 are supplied to the category judgement section 13.

In the category judgement section 13, the maximum value ($S_{N1}$) of similarities with respect to the numeric thesaurus 9, the letter name ($C_{N1}$) thereof, the maximum value ($S_{A1}$) of similarities with respect to the alphabetic thesaurus and the letter name ($C_{A1}$) thereof are extracted. Further, a value ($S_1$) of higher similarities and the letter name ($C_1$) thereof, and a value ($S_2$) of lower similarities and the letter name ($C_2$) thereof are obtained. Then, similarity difference ($S_1 - S_2 = D_F$) between these letters is obtained. The higher the similarity difference, the higher is the reliability of the result of judgement of category. The category judgement section 13 reads out a threshold level $T_H$ corresponding to the extracted letter names ($C_1$, $C_2$) from a threshold level table stored in a first storage section 15, and provides a category candidate from the read-out result and similarity difference $D_F$. For example, the section 13 decides the category to be corresponding to the letter $C_1$ if the similarity difference $D_F$ is higher than the threshold level $T_H$ and decides it to be corresponding to the letters $C_1$ and $C_2$ if the similarity difference is equal to or lower than the threshold level $T_H$. In the first storage section 15, a table of threshold levels corresponding to combinations of the first candidate letters of the highest numeric and alphabetic similarities. In order to increase the precision of the category judgement section 13, different threshold levels are provided for each combination of the letter names ($C_1$, $C_2$). The output of the category judgement section 13 is fed to the format judgement section 17, which receives the output of the detecting section 5. The format judgement section 17 lists the supplied category data for one block and compares the format of the list with a format preliminarily stored in a second storage section 19, for instance a format of a 5-digit numeric block (zip code PC), for checking for the coincidence of the compared formats. The output of the format judgement section 17 is fed to a recognizing section 21.

The output of the detecting section 5 is fed also to the storage register 23 as mentioned earlier. In this storage register 23, the read-out letters of the zip code PC or the like are stored. The stored content of the storage register 23 is fed to the recoginizing section 21. The recoginizing section 21 recoginizes the content of the storage register 23 progressively by a feature extraction method according to the signal from the format judgement section 17.

Figure 3:
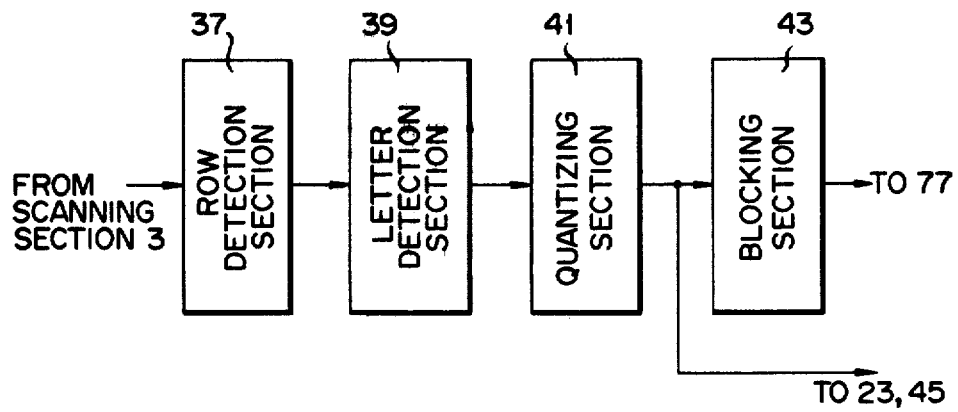
FIG. 3 is a block diagram showing the detailed construction of a detecting section shown in FIG. 1.

FIG. 3 shows a detailed block diagram of the detecting section 5. This section 5 includes a row detection section 37, a letter detection section 39, a quantizing section 41, and a blocking section 43. In the row detecting section 3, a lateral projection of the total field pattern transmitted from the scanning section 3 is taken for detecting a row. In the letter detecting section 39, a longitudinal projection of each row detected by the row detecting section 37 is taken for detecting a row. In the quantizing section 41, a shade pattern corresponding to the positions of the individual letters detected by the letter detection section 39 is quantized to obtain a white-and-black (binary) pattern. In the blocking section 43, one block of alphanumeric letters is produced according to the letter positions detected by the letter detection section 39 and data of the quantizing section 41.

Figures 4, 5:
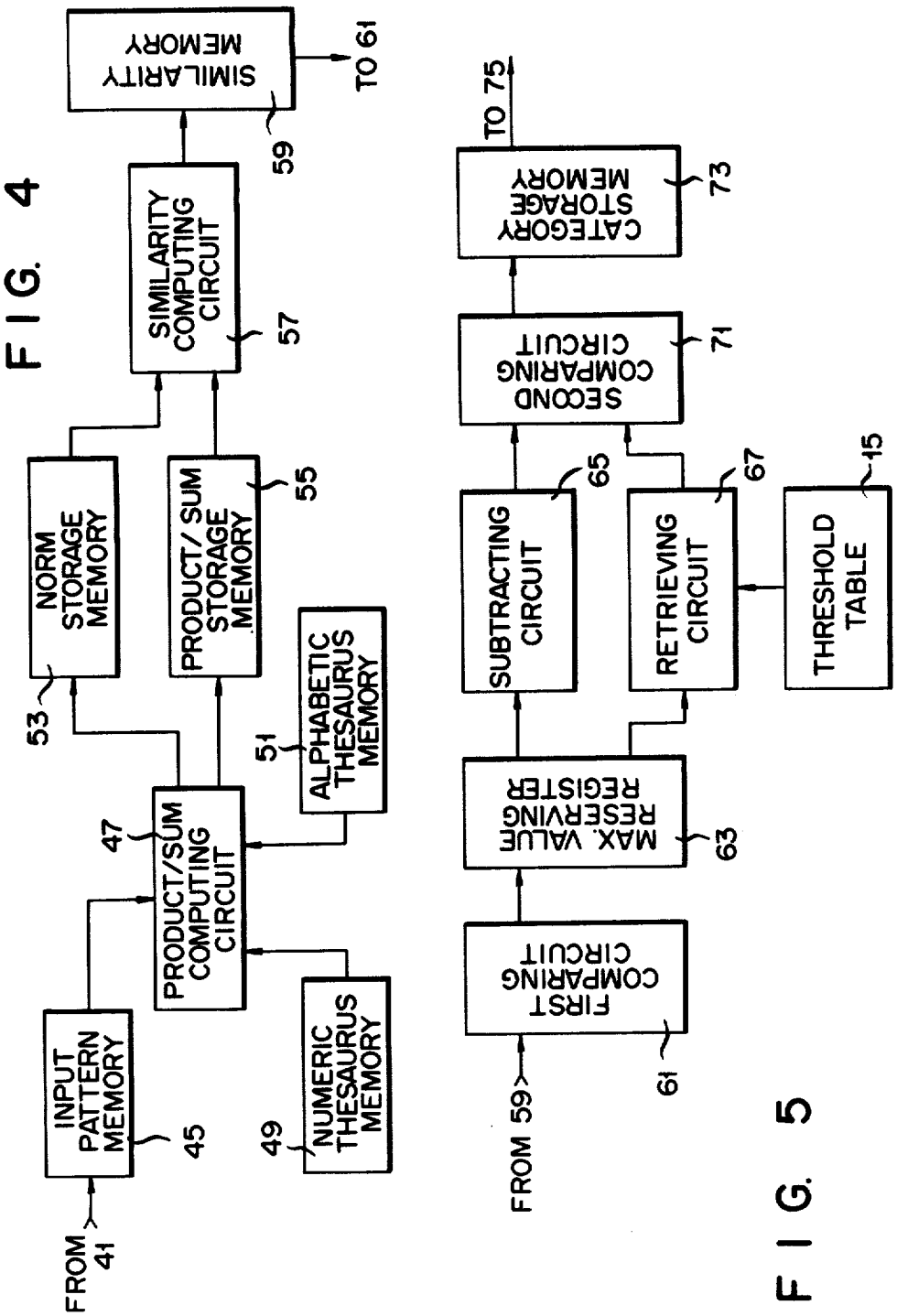
FIG. 4 is a block diagram showing the detailed construction of a similarity computing section.
FIG. 5 is a block diagram showing the detailed construction of a category judgement section shown in FIG. 1.

FIG. 4 shows a detailed block diagram of the similarity computing section 7.

To inputs of a sum of products computing circuit 47 are connected an input pattern memory 45, a numeric thesaurus memory 49 and an alphanumeric thesaurus memory 51. The sum of products computing circuit 47 executes norm computation by using an input pattern supplied from the input pattern memory 45. The computed norm is stored in a norm storage memory 55. The circuit 47 then takes out the thesaurus of one of the letters ("0" to "9" and "A" to "Z") from the numeric and alphabetic thesauruses 49 and 51 and obtains the square of the sum of products of the taken-out thesaurus and input pattern. The result is stored in a sum of products storage memory 55. Thus computation is carried out for all the letters ("0" to "9" and "A" to "Z"). Thus, the sum of products squares for all the letters are stored in the sum of products storage memory 55. A similarity computing circuit 57 takes out the sum of products squares one after another from the sum of products storage memory 55 and computes the similarity of each by dividing it by the norm in the norm storage memory 53. The similarity obtained is stored in a similarity memory 59. This computation is performed for all the sum of products squares stored in the sum of products storage memory 55.

FIG. 5 shows a detailed block diagram of the category judgement section 13. A first comparing circuit 61 compares the individual similarities stored in the similarity memory 59 to obtain the highest similarities ($S_{N1}$ and $S_{A1}$) among the numeric letters and alphabetic letters and the character names ($C_{N1}$ and $C_{A1}$) thereof. Then, the similarities $S_{N1}$ and $S_{A1}$ are compared, and the higher one is made $S_1$ and the lower one $S_2$ and their respective character names $C_1$ and $C_2$. The maximum value that is obtained as a result of the comparison described above is stored in a maximum value reserving register 63. A subtracting circuit 65 obtains a value $S_1 - S_2$ and supplies it to a second comparing circuit 71. In the threshold table, combinations of letters and threshold levels corresponding to the respective combinations are stored as respective pairs.

A retrieving circuit 67 finds out a letter name combination that coincides with the combination of $C_1$ and $C_2$ from a threshold table stored in the first storage section 15 and supplies its threshold level ($T_H$) to the second comparing circuit 71. If the result of comparison in the second comparing circuit 71 is $S_1 - S_2 < T_H$, the name of the category, to which $C_1$ belongs, and the name of the category, to which $C_2$ belongs, are both stored in a category storage memory 73. Alternatively, if $S_1 - S_2 \geq T_H$, only a category name to which $C_1$ belongs is stored in the memory 73.

Figure 6:
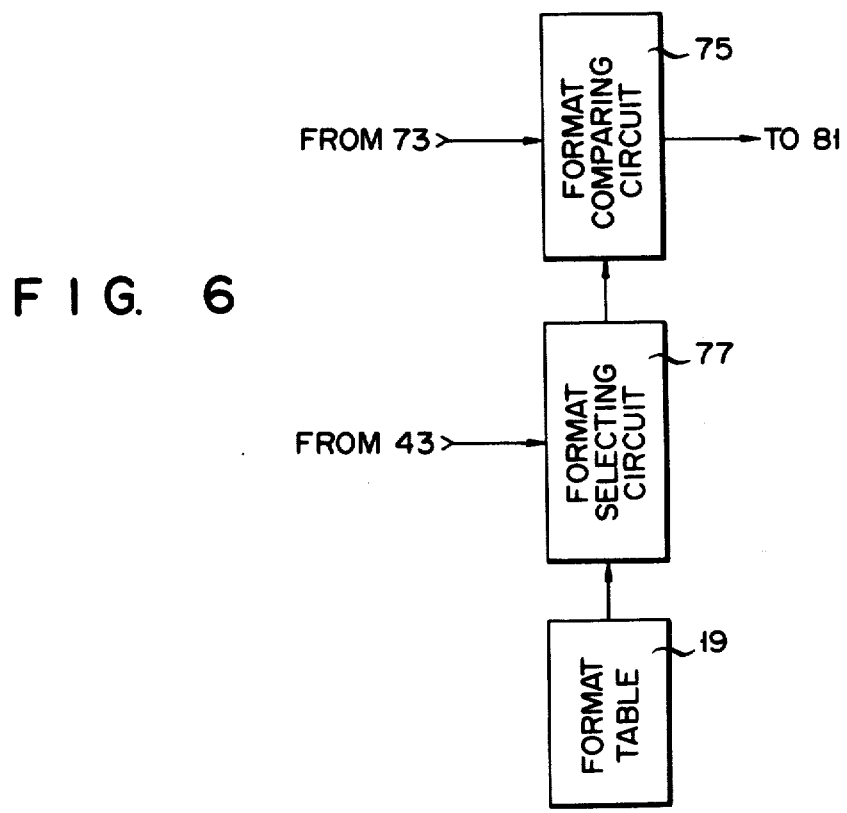
FIG. 6 is a block diagram showing the detailed construction of a format judging section shown in FIG. 1.

FIG. 6 shows a detailed block diagram of the format judgement section 17. A format selecting circuit 77 receives block position data supplied from the detecting section, and selects only the permissible formats in the relevant block position according to the received data and supplies then to a format comparing circuit 75. The data as to whether a format is permissible is possessed by the format itself. A format comparing circuit 75 checks whether the n-th category in a category series supplied from the format selecting circuit 77 coincides with the n-th letter category in the category storage memory 73. If n-th letter category in the category storage memory 73 cannot be checked, the aforementioned category means a plurality of categories. If coincidence for each of the letters is obtained, it is regarded that coincidence is obtained for the block and formats, and the block pattern and formats are supplied to the recognizing section 21. If the coincidence for each of the formats could not have been obtained, that block is discarded.

Figure 7:
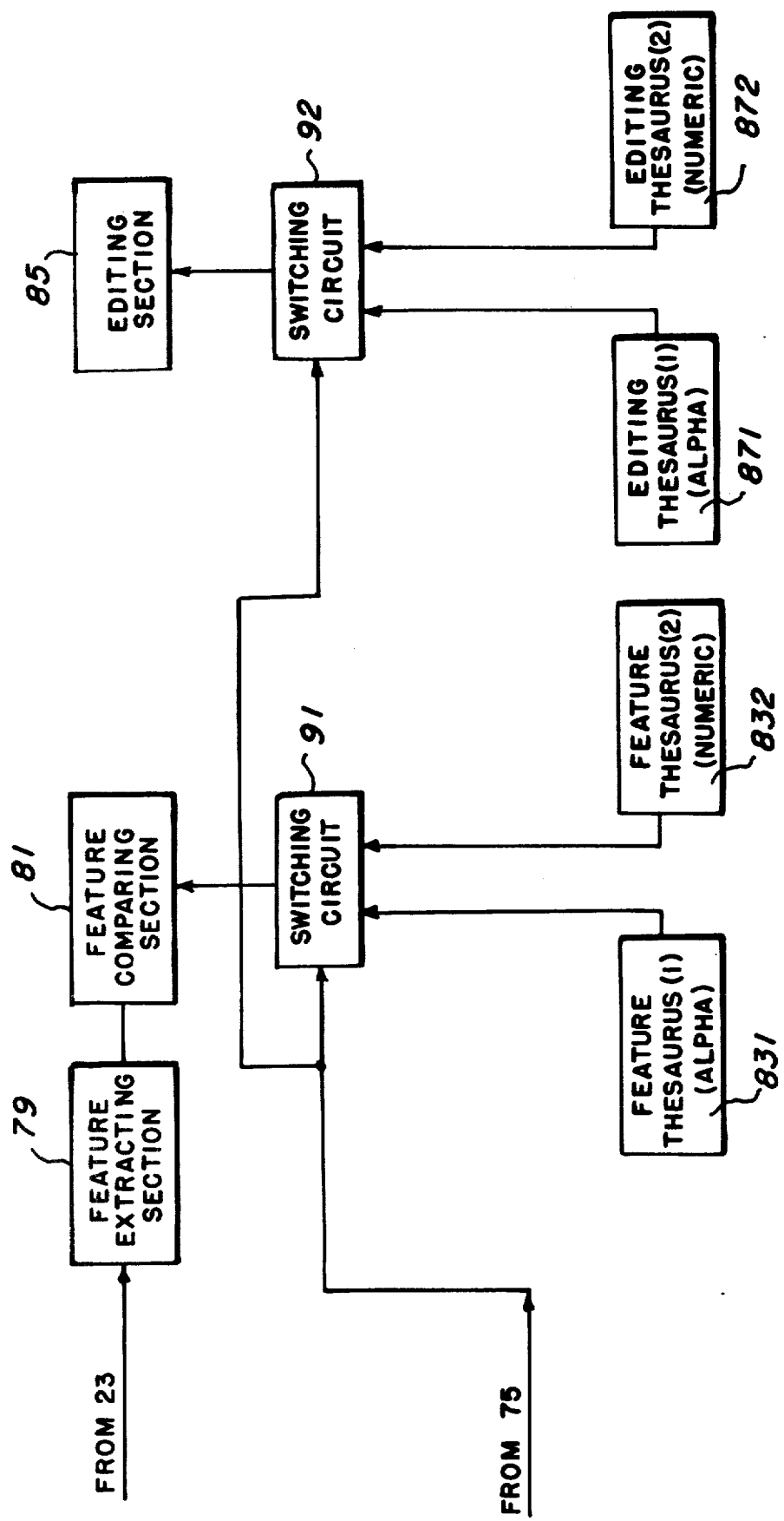
FIG. 7 is a block diagram showing the detailed construction of a recognizing section shown in FIG. 1.

FIG. 7 shows a detailed block diagram of the recognizing section 21.

A feature extracting section 79 surveys the contour of each letter, that is, encodes each letter by detecting the tangential direction at each point on the contour. As a result, a direction code series is obtained. A feature comparing section 81 compares this code series with code series stored as a feature thesaurus 83, and detects coincident thesauruses (zero to several theasuruses). An editing section 85 makes study of the coincident thesauruses obtained in the aforementioned operation, similarities obtained by the matching method and other results in accordance with an algorithm previously registered in the editing thesaurus and determines an answer.

Now, the operation of the embodiment of the figure recognizing system according to the invention, having the construction described above, will be described. A case of finding out a zip code (i.e., 5-digit numeral letter row) which is one figure block in an impression on the postal matter 1 including alphabetic and numeric letters, will be taken. The figure block on the postal matter 1 is read out and photoelectrically converted in the scanning section 2. The output signal from the scanning section 2 is converted in the detecting section 5 into a quantized pattern. At this time, the letter size for each letter is normalized, and correction of the row position and letter position is made. The data thus obtained from the detecting section 5 is fed to the similarity computing section 7. The similarity computing section 7 computes the letter pattern of each letter supplied by using the numeric and alphabetic thesauruses 9 and 11. Each of the calculated similarities is fed to the category judgement section 13, whereby the maximum value ($S_{N1}$) of the similarity with respect to the numeric thesaurus 9, the letter name ($C_{N1}$) thereof, the maximum value ($S_{A1}$) of the similarity with respect to the alphanumeric thesaurus 11 and the letter name ($C_{A1}$) thereof are extracted. Further, a value ($S_1$) of the higher similarities and the letter name ($C_1$) thereof, and a value ($S_2$) of lower similarities and the letter name ($C_2$) thereof are obtained. Then, similarity difference ($S_1 - S_2 = D_F$) between these letters is obtained. The category judging section 13 reads out the threshold level $T_H$ of the extracted letter names ($C_1$, $C_2$) from the first storage section 15 and, if the similarity difference $D_F$ is higher than the threshold level, judges the read-out data to be the category $C_{AT1}$ corresponding to the letter $C_1$ while judging it to be the categories $C_{AT1}$ and $C_{AT2}$ corresponding to both the letters $C_1$ and $C_2$.

The format judging section 17 lists the judgement results of the individual catterogy letters supplied for one block and compares the listed formats with the format stored in the second storage section 19 to see if the former coincides with the latter. At this time, the latter pattern for one block detected in the detecting section 5 is stored in the storage register 23. When a coincidence is obtained as the judgement result in the format judgement section 17, the recognizing section 21 progressively recoginizes the content of the storage register 23 by the feature extraction method. If the judgement result is different from the numeral letter block, the stored content in the storage register 23 is discarded, and the reading of a different letter block is effected.

While the above embodiment has dealt with numeral letter blocks such as zip codes as character rows consisting of character series, this is by no means limitative, for example, blocks consisting of alphabet letters or blocks consisting of alphabet and numeral letters may be dealt with as well. Also, while the checking of format has been done by taking coincidence, it is also possible to use a weight addition method, in which a weight is added to each letter caterogy result, addition is made of numeral letters and the category having the maximum weight is made the category of the letter block. Further, there may be a plurality of different kinds of formats that are compared.

While the invention has been particularly shown and described with reference to a preferred embodiment thereof, it will be understood by those skilled in the art that various changes in the form and details may be made therein without departing from the spirit and scope of the invention.

What is claimed is:

1. A figure recognizing system comprising:
   (a) a scanning section for reading out letter information of various letter species recorded on a recording medium;
   (b) a detecting section connected to said scanning section for effecting letter detection from the letter information from said scanning section;
   (c) thesauruses consisting of standard letter patterns of various letter species corresponding to said various letter species;
   (d) a similarity computing section for receiving information from said detecting section and standard letter pattern information from said thesauruses and computing the similarity corresponding to the letter information from said detecting section;
   (e) threshold table means in which letter combinations and threshold levels for the respective letter combinations are stored as pairs;
   (f) a category judgement section for receiving the output of said similarity computing section, obtaining a similarity difference from the maximum and next maximum values of said similarity and comparing said similarity difference and a corresponding threshold level of said threshold table means to judge the category of said letter; (g) format table means where a predetermined category series is stored;
   (h) format judging means connected to said detecting section and category judgement section for comparing a category supplied from said detecting section and a category series supplied from said detecting section;
   (i) storage means for storing the detected information from said detecting section; and
   (j) a recognizing section connected to said format judging section and storage means for recognizing the content of said storage means to provide final letter information if a coincidence is obtained as a result of judgement in said format judging section.

2. The figure recognizing system according to claim 1, wherein said category judgement section includes:
- a first comparing circuit for comparing the similarities provided from said similarity computing section to derive the maximum similarity ($S_{N1}$, $S_{A1}$) and the letter name ($C_{N1}$, $C_{A1}$) thereof and compute high and low values ($S_1$, $S_2$) of said maximum similarity ($S_{N1}$, $S_{A1}$) and letter names ($C_1$, $C_2$) corresponding to said high and low values;
- a maximum value reserving register for storing the high and low values ($S_1$, $S_2$) output from said first comparing circuit and corresponding lettr names ($C_1$, $C_2$);
- a subtracting circuit receiving the output of said maximum value reserving register and subtracting said low value ($S_1$) from said high value ($S_2$);
- a retreaving circuit for retreaving the output of said maximum value reserving register and finding out the letter name combination coincident with said combination of letter names ($C_1$, $C_2$) to provide the corresponding threshold level ($T_H$);
- a second comparing circuit for receiving the output of said subtracting circuit and the output of said retreaving circuit and comparing said subtracted value ($S_1 - S_2$) and said threshold level ($T_H$) to provide the category name to which $C_1$ belongs if $S_1 - S_2 \geq T_H$ and provide both the category name to which $C_1$ belongs and category name to which $C_2$ belongs if $S_1 - S$-hd $2 < T_H$; and
- a category storage memory for storing a category name provided from said second comparing circuit.

3. The figure recognizing system according to claim 1, wherein said format judgement section includes:
- a format selecting circuit for receiving the block position data supplied from said detecting section and selecting only the formats permissible in the block position of the received data as a category series; and
- a format comparing circuit for comparing the n-th category of the category series supplied from said format selecting circuit and the n-th letter category supplied from said category judgement section and supplying the block and formats to said recognizing section if a coincidence is obtained while discarding the block if no coincidence is obtained.

* * * * *